United States Patent
Ros et al.

(10) Patent No.: US 10,528,471 B2
(45) Date of Patent: Jan. 7, 2020

(54) SYSTEM AND METHOD FOR SELF-INVALIDATION, SELF-DOWNGRADE CACHECOHERENCE PROTOCOLS

(71) Applicant: ETA SCALE AB, Uppsala (SE)

(72) Inventors: Alberto Ros, Cartagena (ES); Stefanos Kaxiras, Uppsala (SE)

(73) Assignee: ETA SCALE AB, Uppsala (SE)

( * ) Notice: Subject to any disclaimer, the term of this patent is extended or adjusted under 35 U.S.C. 154(b) by 71 days.

(21) Appl. No.: 15/855,378

(22) Filed: Dec. 27, 2017

(65) Prior Publication Data

US 2018/0181490 A1     Jun. 28, 2018

Related U.S. Application Data

(60) Provisional application No. 62/439,189, filed on Dec. 27, 2016.

(51) Int. Cl.
| | |
|---|---|
| *G06F 12/0831* | (2016.01) |
| *G06F 12/0811* | (2016.01) |
| *G06F 12/1018* | (2016.01) |
| *G06F 12/128* | (2016.01) |

(52) U.S. Cl.
CPC ...... *G06F 12/0831* (2013.01); *G06F 12/0811* (2013.01); *G06F 12/1018* (2013.01); *G06F 12/128* (2013.01); *G06F 2212/283* (2013.01); *G06F 2212/621* (2013.01)

(58) Field of Classification Search
None
See application file for complete search history.

(56) References Cited

U.S. PATENT DOCUMENTS

| | | | | |
|---|---|---|---|---|
| 2008/0140935 A1* | 6/2008 | Cypher | ............... | G06F 12/0811 |
| | | | | 711/118 |
| 2015/0278094 A1* | 10/2015 | Ma | ......................... | G06F 9/467 |
| | | | | 711/122 |
| 2016/0321181 A1* | 11/2016 | Kaxiras | ............... | G06F 12/0815 |

OTHER PUBLICATIONS

Alberto Ros et al., "Complexity-effective multicore coherence," 21st International Conference on Parallel Architectures and Compilation Techniques (PACT), Sep. 19-23, 2012, Minneapolis, Minnesota.
Alvin R. Lebeck et al., "Dynamic self-invalidation: Reducing coherence overhead in shared-memory multiprocessors," 22nd International Symposium on Computer Architecture (ISCA), 1995.
(Continued)

*Primary Examiner* — Denise Tran
(74) *Attorney, Agent, or Firm* — Patent Portfolio Builders PLLC (57) ABSTRACT

Methods and systems for self-invalidating cachelines in a computer system having a plurality of cores are described. A first one of the plurality of cores, requests to load a memory block from a cache memory local to the first one of the plurality of cores, which request results in a cache miss. This results in checking a read-after-write detection structure to determine if a race condition exists for the memory block. If a race condition exists for the memory block, program order is enforced by the first one of the plurality of cores at least between any older loads and any younger loads with respect to the load that detects the prior store in the first one of the plurality of cores that issued the load of the memory block and causing one or more cache lines in the local cache memory to be self-invalidated.

16 Claims, 4 Drawing Sheets

(56) References Cited

OTHER PUBLICATIONS

Sarita V. Adve et al., "Weak ordering—a new definition," 17th International Symposium on Computer Architecture, 1990, pp. 2-14.

Stefanos Kaxiras et al., "A new perspective for efficient virtual-cache coherence," 40th International Symposium on Computer Architecture (ISCA), 2013, Tel-Aviv, Israel.

* cited by examiner

SYSTEM AND METHOD FOR SELF-INVALIDATION, SELF-DOWNGRADE CACHECOHERENCE PROTOCOLS

RELATED APPLICATION

The present application is related to, and claims priority from, U.S. Provisional Patent Application No. 62/439,189, filed on Dec. 27, 2016, entitled "Racer: TSO Consistency Via Race Detection" to Alberto Ros and Stefanos Kaxiras, the disclosure of which is incorporated herein by reference.

TECHNICAL FIELD

Embodiments described herein relate in general to coherence in multiprocessor systems and, more particularly, to a novel approach of enforcing coherence via data-race detection.

BACKGROUND

In many multiprocessor systems, memory devices are organized in hierarchies including main memory and one or more levels of cache memory. Data can reside in one or more of the cache levels and/or main memory. Cache coherence protocols are used in multiprocessor systems to address the potential situation where not all of the processors see the same data value for a given memory location.

Memory systems are said to be coherent if they see memory accesses to a single data location in order. This means that if a write access is performed to data location X, and then a read access is performed to the same data location X, the memory hierarchy should return X regardless of which processor performs the read and write and how many copies of X are present in the memory hierarchy. Likewise, coherency also typically requires that writes be performed in a serialized manner such that each processor sees those write accesses in the same order.

There are various types of cache coherency protocols and mechanisms. For example, "explicit invalidation" refers to one mechanism used by cache coherence protocols wherein when a processor writes to a particular data location in a cache then all of the other caches which contain a copy of that data are flagged as invalid by sending explicit invalidation messages. An alternative mechanism is updating wherein when a processor writes to a particular data location in a cache, then all of the other caches which contain a copy of that data are updated with the new value. Both of these cache coherence mechanisms thus require a significant amount of signaling, which scales with the number of cores (or threads) which are operating in a given data processing system. Accordingly, these various cache protocols and mechanisms are known to have their own strengths and weaknesses, and research continues into improving cache coherency protocols with an eye toward maintaining (or improving) performance while reducing costs (e.g., energy consumption) associated with coherency traffic.

For example, recently a number of proposals have been set forth which aim to simplify coherence by relying on data-race-free semantics and on self invalidation to eliminate explicit invalidation traffic and the need to track readers at the directory. The motivation for simplifying coherence has been established in numerous articles, some of which are mentioned herein. For example, with the addition of self-downgrade, the directory can be eliminated, see, e.g., A. Ros and S. Kaxiras, "Complexity-effective multicore coherence," in 21st International Conference on Parallel Architectures and Compilation Techniques (PACT), 2012, and virtual cache coherence becomes feasible at low cost, without reverse translation, see, e.g., S. Kaxiras and A. Ros, "A new perspective for efficient virtual-cache coherence," in 40th International Symposium on Computer Architecture (ISCA), 2013. Significant savings in area and energy consumption without sacrificing performance, have also been demonstrated. Additional benefits regarding ease-of-verification, scalability, time-to-market, etc., are possible as a result of simplifying rather than complicating such fundamental architectural constructs as coherence.

In self-invalidation cache coherence protocols, writes on data are not explicitly signaled to sharers as is the case with explicit invalidation cache coherence protocols. Instead, a processor automatically invalidates its locally stored cache copy of the data. However, data races throw such self-invalidation protocols into disarray, producing non-sequential-consistent executions, see, e.g., A. R. Lebeck and D. A. Wood, "Dynamic self-invalidation: Reducing coherence overhead in shared-memory multiprocessors," in 22nd International Symposium on Computer Architecture (ISCA), 1995. As will be appreciated by those skilled in the art, a data race occurs when: two or more threads access the same memory location concurrently, and. at least one of the accesses is for writing, and the threads are not using any exclusive locks to control their accesses to that memory location. All such proposals seen thus far offer sequential consistency for data-race-free (DRF) programs, see, e.g., S. V. Adve and M. D. Hill, "Weak ordering—a new definition," in 17th International Symposium on Computer Architecture, 1990.

Data-race-free semantics require that conflicting accesses (e.g., a read and a write to the same address from different cores or processors) must be separated by synchronization (perhaps transitive over a set of threads). Self-invalidation is therefore initiated on synchronization. This synchronization must be exposed to the coherence mechanisms by the software, i.e., existing self-invalidation coherence protocols require cooperation with the application software running on the system. However this requirement increases the complexity of the software and runs the risks of errors occurring if proper cooperation between the self-invalidation coherence protocols and the software is not provided.

Accordingly, it would be desirable to provide systems and methods for cache coherence that do not require software to expose synchronization.

SUMMARY

The embodiments described herein, among other things, address the weaknesses of coherence based on self-invalidation, mainly its reliance on software to expose synchronization for correct operation, described above, but at the same time refrain from compromising some of its important properties such as simplicity and reordering of data-race-free memory accesses. For example, such embodiments can be used in systems that simplify coherence by eliminating some or all explicit invalidation, without resorting to help from software nor imposing any restrictions to software.

According to an embodiment, a computer system includes multiple processor cores, and at least one local cache memory associated with and operatively coupled to each core for storing one or more cache lines accessible only by the associated core. The computer system also includes a shared memory, the shared memory being operatively coupled to the local cache memories and accessible by the cores, the shared memory being capable of storing a plurality of cache lines. A core accessing the shared memory to load a memory block after the core misses in its at least one local cache memory, detects a prior store from another core to the memory block. The detection of the prior store enforces program order of loads which are being executed by the core that issued the load of the memory block, such that loads which initiated prior to the load of the memory block are completed and loads which initiated after the load of the memory block are re-executed after completion of the load of the memory block. The detection of the prior store also causes one or more cache lines in the at least one local cache memory of the core to be self-invalidated.

According to an embodiment, a computer system includes a plurality of cores; a private cache memory associated with each of the plurality of cores; a shared memory; and a read-after-write detection structure containing address information containing address information associated with store instructions that have been executed since a last race condition was detected.

According to an embodiment, a method self-invalidating cachelines in a computer system having a plurality of cores is described. A first one of the plurality of cores, requests to load a memory block from a cache memory local to the first one of the plurality of cores, which request results in a cache miss. This results in checking a read-after-write detection structure to determine if a race condition exists for the memory block. If a race condition exists for the memory block, program order is enforced by the first one of the plurality of cores at least between any older loads and any younger loads with respect to the load that detects the prior store in the first one of the plurality of cores that issued the load of the memory block and causing one or more cache lines in the local cache memory to be self-invalidated. According to another embodiment, a computer system includes: a plurality of cores, a private cache memory associated with each of the plurality of cores, a shared memory; and a read-after-write detection structure containing address information containing address information associated with store instructions that have been executed since a last race condition was detected.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of multiprocessor or multicore cache coherence protocols. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Embodiments described below provide for a system and method that provides coherence by self-invalidating and writing-through shared data on data-race detection points. In prior state-of-the-art these operations (i.e., self-invalidating and writing-through) take the form of fences: and synchronization—which actually constitutes data races—is explicitly exposed to the coherence system by fence instructions inserted in the code. By way of contrast, embodiments described herein provide for software that does not need to explicitly insert synchronization fences or in any way expose synchronization points to the coherence system while still addressing the challenges posed by potential data races.

In one embodiment, the disclosed system and method employs implicit self-invalidation/write-through fences (as opposed to explicit fence instructions which are actually placed into the software code) without any a-priori knowledge of program synchronization. The disclosed system and method detects data races during program execution which are equated to synchronization points that invoke implicit self-invalidation fences. This can be accomplished by, for example, assigning acquire semantics on a racing read operation involved in a data race (causing an implicit self-invalidation fence on the reading core) and release semantics on a racing write operation (ensuring that the store order of the writer is correctly observed by the racing read). All other accesses not involved in a race become data-race-free. These other accesses are unordered between data races but become ordered with respect to the data races. The resulting coherence protocol supports the Total Store Ordering (TSO) and weaker memory models.

Figure 1:
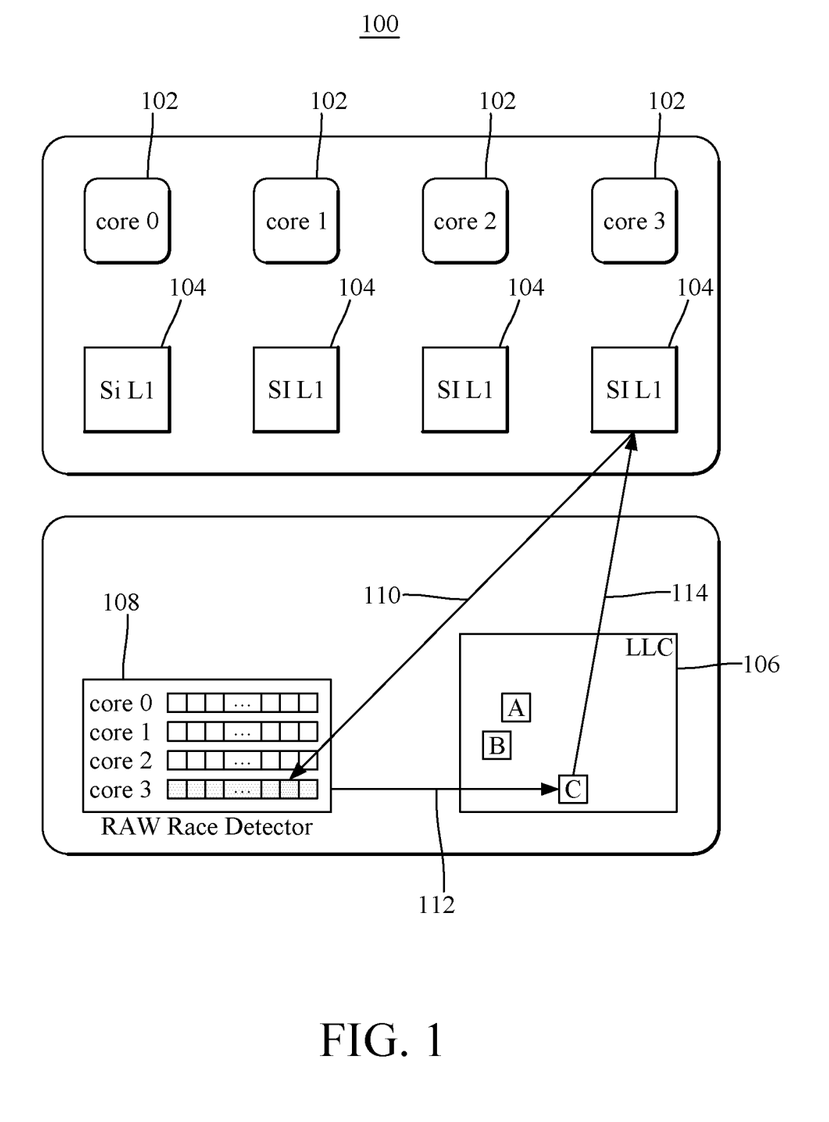
FIG. 1 depicts an exemplary multiprocessor architecture including a read-after-write race detector according to an embodiment.

An example of a coherence mechanism which operates using such implicit self-invalidation/write-through fences will now be discussed with respect to an illustrative computing system 100 shown in FIG. 1. Therein, system 100 includes four cores (processors) 102 each of which have their own, private level 1 (L1) cache 104, and a shared lower level cache (LLC) 106. Additionally, according to this embodiment, computer system 100 includes a read-after-write (RAW) race detector 108. As discussed in more detail below, RAW race detector 108 can be implemented as a signature based table that sits at the level of the LLC 106, i.e., the RAW race detector 108 sees the same requests coming from the private cache memories 104 of the core 102 as the LLC 106 and can also see the requests and replies to and from memory that may be initiated and received by the LLC 106.

According to an embodiment, the RAW race detector 108 detects Read-After-Write races by tracking the memory address written by a store operation that has not yet been observed by cores other than the core that executed the store operation.

Figure 2:
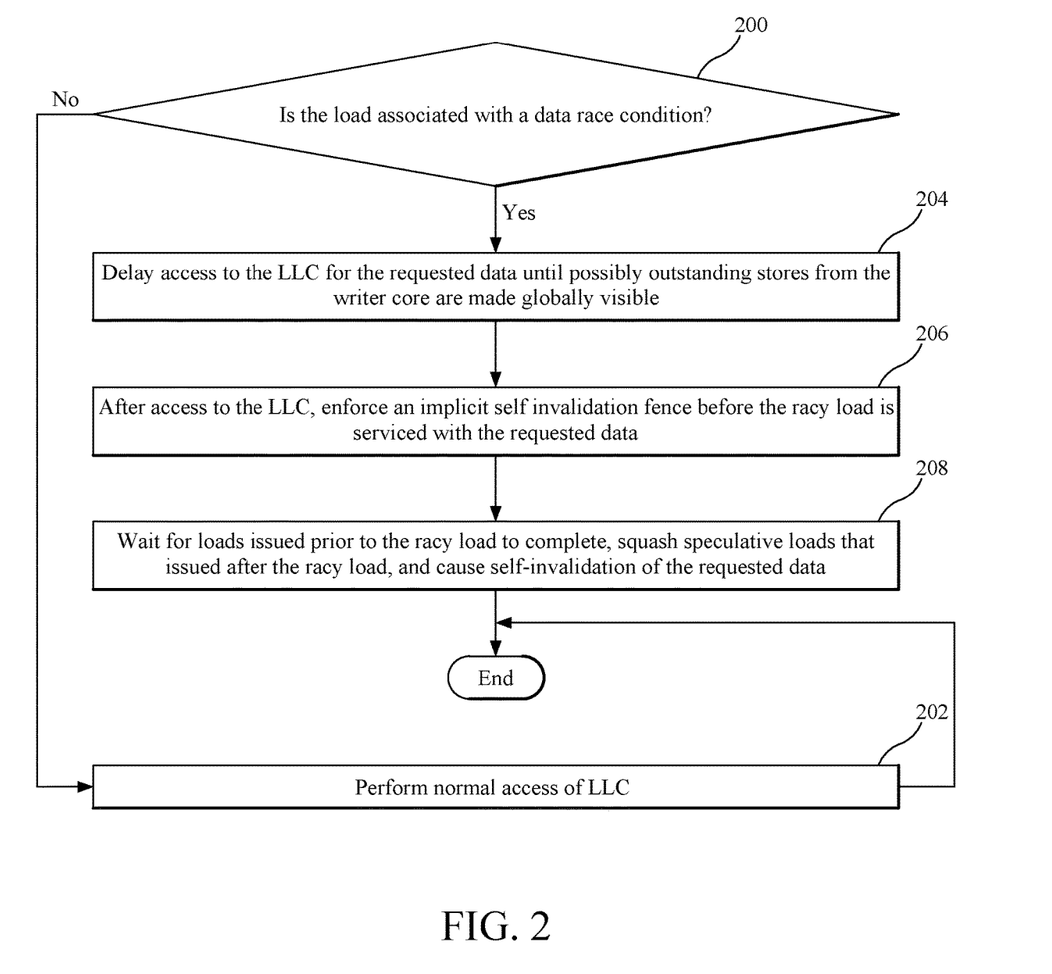
FIG. 2 is a flowchart illustrating a method for self-invalidation of cache lines according to an embodiment.

In one embodiment, system 100 operates as follows and as shown by the method flowchart of FIG. 2. When a load (read) instruction issued by one of the cores 102 misses in its private L1 cache, that core sends a request 110 to the LLC 106 where the RAW race detector 108 is located. In the example of FIG. 1, this requesting core is core 3 102. As shown by the "No" output of decision block 200, if no data race is indicated by RAW race detector 108, then the requested cacheline can be accessed from the LLC 106 as normal at step 202, If, however, a data race is detected in the RAW race detector 108 for this read request (the manner in which races are detected in RAW race detector 108 being described below) then the following actions as shown following the "Yes" path from block 200 in the flow chart of FIG. 2 are taken to handle this racy load:

1. According to one embodiment, the store(s) from the writer core are ordered and the LLC access 112 for the racy load can be performed in program order relative to those store(s). According to another embodiment, if the store(s) from the writer core are not ordered, then the LLC access 112 for the racy load is delayed until possibly outstanding stores from writer core 102 (which is creating the data race with the read request from core 3 102) are made globally visible in a correct order (step 204).

2. After the LLC access 112 for the racy load occurs, the response 114 to the core 3 102 enforces an implicit self-invalidation fence (SI-fence) before the racy load is serviced with the requested data (step 206). Response 114 can include, in addition to the requested data, an indication (yes or no) of whether a race was detected by RAW race detector 108 and, optionally, an identity of the writer core(s) 102 which created the race.

3. The implicit SI-fence, as implemented by the core 102 which issued the racy load in response to the indication that a race existed, waits for the completion of all outstanding loads that are older in program order than the racy load, squashes speculative loads that issued after (in program order) the racy load, and then causes a self-invalidation of either all the requested data or only the shared portion of the requested data (if private/shared classification, described below, is used) in the core's L1 cache (step 208). Thus, the racy load that caused the miss, if it detects a race, also behaves as an SI-fence instruction like the one that the software would put in the code—this means that "load/SI-fence" will impose order in the load instructions of this core so that all older loads for that core 102 (in program number order) must be completed and no younger loads for that core 102 (in program number order) are executed (if a younger load has already executed, it is squashed since it executed speculatively) and before the core continues with younger memory access instructions its private cache(s) will be self-invalidated (optionally only the shared data in those cache(s) 104 if private/shared data is distinguishable according to some embodiments.

Stated differently, step 208 equivalently be explained that upon the detection of the prior store (i.e., race detection) the core 102 enforces program order of loads which are being executed by the core that issued the load of the memory block that resulted in the detection of the prior store, such that loads which initiated prior to the load of the memory block are completed and loads which initiated after the load of the memory block are re-executed after completion of the load of the memory block.

Together, steps 200-208 described above and briefly summarized in FIG. 2, enable systems and methods described by these embodiments to provide cache coherence mechanisms which generate implicit self-invalidation/write-through fences, rather than requiring explicit (i.e., computer program instructions) self-invalidation/write-through fences. As mentioned above, however, the process begins by determining if a cache miss is associated with data that is involved in a data race. Thus the manner in which RAW race detector 108 operates to determine if a particular block of data is involved in a data race will now be described with respect to FIGS. 3-5.

Figure 3:
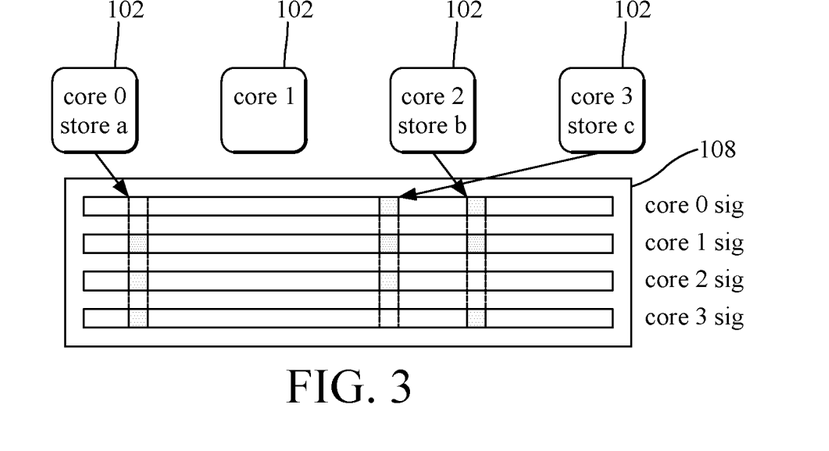
FIGS. 3-5 depict a read-after-write race detector at different points in time according to an embodiment.

FIG. 3 illustrates how signatures, or more generally race information, is stored in the RAW race detector table 108. Each row in table 108 is thus associated with one of the cores 102, and contains that core's signature or race information. Consider that, initially and in one embodiment, each store operation (target address and data) is sent to the LLC 106 in program order. When a core 102 executes a store operation, it also inserts the target address associated with that store operation in the signature of all other cores—but not the signature of its own core—and stores its data in the LLC 106. In FIG. 3, for example, core 0 102 inserts address 'a' into the signatures of cores 1, 2, and 3, but not the signature of core 0 102. Similarly, when core 2 102 executes a store operation, it inserts target address b associated with that store operation into the signatures in table 108 for cores 0, 1 and 3. Lastly, when core 3 102 executes a store operation, it inserts target address c associated with that store operation into the signatures in table 108 for cores 0, 1 and 2.

Figure 4:
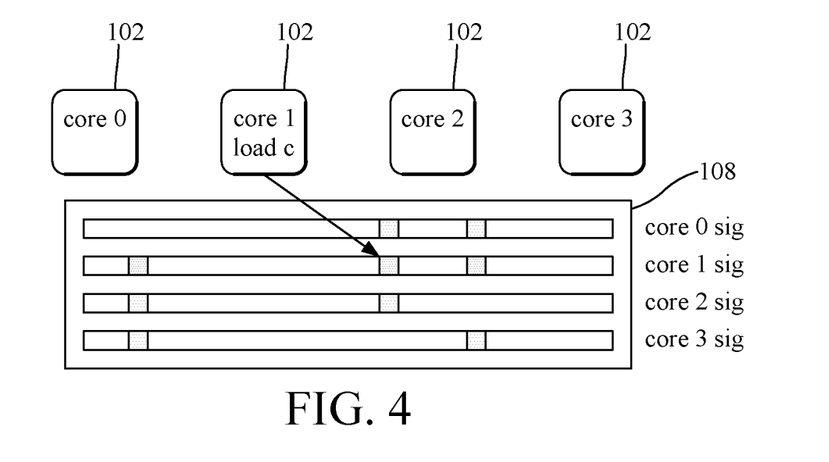
Figure 5:
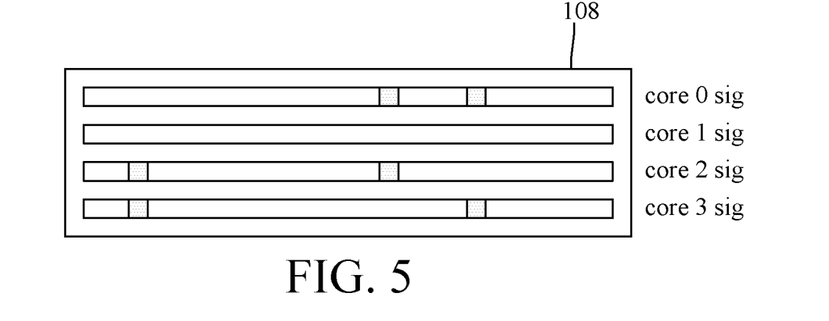

In this way, the RAW-Race detector, records store operations for each core that were made by all of the other cores since that core's last detection of a data-race. That is, each signature in table 108 contains, for its associated core, the addresses of all of the store operations performed by the other cores since the last time that a data race was detected by that core. Thus, a core 102 has not "seen" any of the stores in its corresponding RAWR signature in table 108 until that core tries to request data, fails to find it in its local cache 104, and then checks its signature in RAW race detector table 108. For example, as shown in FIG. 4, when core 1 102 attempts to load data from address c and misses in its local cache, it will send a request 110 to check its signature. In this example, because core 3 had previously performed a store operation to address c as shown in FIG. 3, core 1's signature in table 108 includes address c. At that moment, a RAW race is detected by RAW race detector 108 and the steps described above with respect to steps 204-208 are performed. Then the row of signature table 108 associated with core 1 is cleared of entries as shown in FIG. 5, to be repopulated as new stores occur and until the next race condition is detected by core 1.

The foregoing describes one or more embodiments. However, as will be appreciated by those skilled in the art, a number of variations, permutations and details associated with those embodiments can be considered, some of which will now be discussed.

In one embodiment, the disclosed system comprises self-invalidation and write-through coherence mechanisms coupled with data-race detection. The coherence mechanisms do not require a directory to track sharers and writers, do not require explicit invalidations, do not require indirection, and do not require timestamps (to detect and enforce ordering).

In one embodiment, the disclosed system and method uses private caches that are self-invalidated on demand (SI-caches).

In one embodiment, data the disclosed system uses data classification into Private and Shared (page-base OS-assisted approach, or hardware assisted) to only self-invalidate shared data in the local SI-caches. Accesses to private data do not invoke any of the mechanisms described herein. In a private to shared transition, the corresponding dirty data can be written through to a shared cache level before allowing the access that causes the transition to continue.

In one embodiment, the RAWR detects Read-After-Write races at a block granularity, for a memory block that contains both the target address of a store and the target address of a matching subsequent access. The block granularity can be any of (but not limited to): byte, word, double word, quad-word, cache-line, sub-page, page, super-page.

In one embodiment, not every load is sent to the RAW race detector 108—only loads that miss in the private core caches go to the RAW race detector 108 as they have to go to the LLC 106 regardless. According to other embodiments, every load can be sent to the RAW race detector 108. According to still other embodiments, the RAW race detector 108 is eventually checked also for loads that hit on the same cache line. In other words, according to some embodiments, cache memory systems cannot indefinitely hit on a cacheline and never check the loads that hit on it for a race. Eventually such systems will also check even that cacheline.

In one embodiment, cache lines in the SI-cache can only be accessed for a limited time before causing a (non-blocking) check for a race. In a self-invalidation cache, in absence of explicit invalidations, a load can hit indefinitely on stale data, instead of detecting a race. This mechanism ensures the eventual discovery of a data race.

In one embodiment, a small coarse-grained counter per cache-line (e.g., 2-bit), ticks a number of cycles. When the counter saturates, the next access to the cache line emits a check for a race and resets the counter.

In one embodiment, cache lines in the SI-cache can only be accessed for a limited number of times before causing a (non-blocking) check for a race. A small coarse-grained counter per cache-line, counts the accesses to the cache line. When the counter saturates, the next access to the cache line emits a check for a race and resets the counter.

In one embodiment, the check for a race only invalidates the corresponding L1 cache line if it detects a race in the RAWR—no further action is taken. This solitary invalidation, causes the next access to miss, detect the race, and self-invalidate all the shared data in the L1 via an implicit SI-fence.

In one embodiment, RAWR uses an array of signatures (Bloom filters), one filter per core. Without loss of generality, signatures in this figure are simple one-bit address hashes. Different Bloom filter implementations including H3 (both with single and multiple hash functions), Bulk, and Xor (Log™) can be used.

In one embodiment, stores coming from a writing core are sent to the LLC out of program order and may insert their target address in the RAWR signatures of other cores out of program order. When a core detects a race with a store in the RAWR, the core is not notified about the race until at least all younger stores (in program order) coming from the writing core, which inserted the racy store in the RAWR, have completed both in the LLC and in the RAWR.

In one embodiment, stores coming from a writing core are sent to the LLC coalesced in one or more cache lines and insert their target addresses in the RAWR atomically per cache line or atomically for a group of cache lines. When a core detects a race with a store in the RAWR, the core does not access the LLC and is not notified about the race until at least all younger stores (in program order) coming from the writing core, which inserted the racy store in the RAWR, have completed both in the LLC and in the RAWR.

In one embodiment, when a core detects a race in RAWR, its signature is cleared. The core's signature begins recording new stores in it. Clearing the signature is a set-row-to-zero operation and gives more accurate race detection, but it is not required for correctness.

In one embodiment, the LLC is distributed in banks or tiles or has a NUCA architecture (Sparc M7). The RAWR is banked and distributed along with the LLC. Each RAWR bank is responsible for the blocks that map to its corresponding (local) LLC bank. When a race is detected in a distributed RAWR the clearing of the core's signature (distributed in RAWR banks) happens globally, before the response to the racy access is returned. The bank where the race is detected sends a message to all other banks to clear their part of the signature and waits for confirmation before replying to the racy access. No coordination is needed with respect to stores that can modify the signature in other banks.

In one embodiment, instructions that detect races in the RAWR are marked in a prediction table after one or more successful race detections. The next time an instruction that is in the prediction table accesses the L1, it immediately invalidates the accessed cache line and proceeds to the LLC and to check the RAWR.

Figure 6:
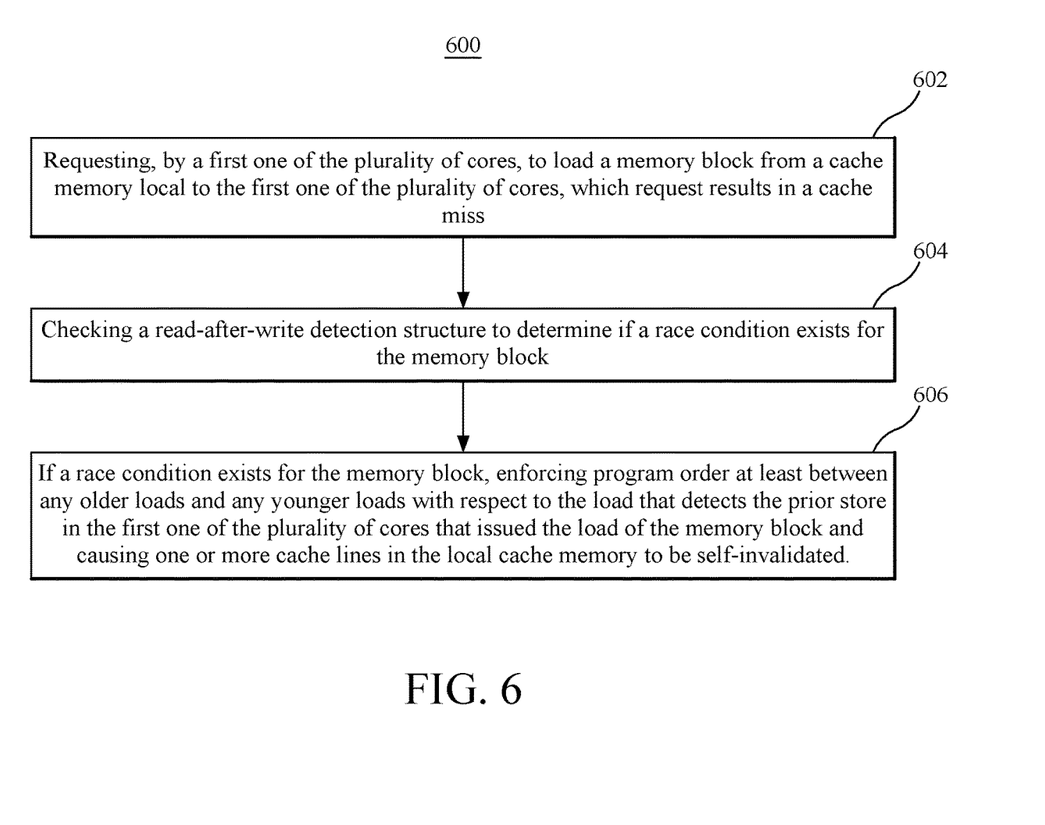
FIG. 6 is a flowchart illustrating a method for self-invalidation of cache lines according to an embodiment.

Another method embodiment 600 is illustrated in the flowchart of FIG. 6. Therein, at step 602, a first one of the plurality of cores requests to load a memory block from a cache memory local to the first one of the plurality of cores, which request results in a cache miss. This results, in step 604, in checking a read-after-write detection structure to determine if a race condition exists for the memory block. If a race condition exists for the memory block, at step 606, program order is enforced at least between any older loads and any younger loads with respect to the load that detects the prior store in the first one of the plurality of cores that issued the load of the memory block and causing one or more cache lines in the local cache memory to be self-invalidated.

The embodiments thus provide an efficient mechanism for enforcing, among other things, coherence with self-invalidation and write-through without the requiring software to expose synchronization points to the hardware. In this respect, the embodiments retain valuable properties of self-invalidation protocols: simplicity, low cost, compatibility with virtual caches. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

The foregoing embodiments provide for, among other things, an efficient self-invalidation and write-through coherence system and method that guarantees the most common memory consistency models (including but not limited to: Total Store Order or TSO, Weak Memory Ordering, Release Consistency), and at the same time maintains the relaxed-ordering advantages of SC-for-DRF coherence without requiring any software cooperation.

Without requiring a directory and/or explicit invalidations, the disclosed system and method achieves this by, for example, detecting read-after-write races and causing self-invalidation on the racing reader's cache. Race detection is performed using an efficient signature-based mechanism at the level of the shared cache.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general-purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computer system comprising:
    multiple processor cores;
    at least one local cache memory associated with and operatively coupled to each core for storing one or more cache lines accessible only by the associated core;
    a shared memory, the shared memory being operatively coupled to the local cache memories and accessible by the cores, the shared memory being capable of storing a plurality of cache lines;
    wherein a core accessing the shared memory to load a memory block after the core misses in its at least one local cache memory, detects a prior store from another core to the memory block;
    and wherein the detection of the prior store enforces program order of loads which are being executed by the core that issued the load of the memory block, such that loads which initiated prior to the load of the memory block are completed and loads which initiated after the load of the memory block are re-executed after completion of the load of the memory block
    and wherein the detection of the prior store causes one or more cache lines in the at least one local cache memory of the core to be self-invalidated.

2. The computer system of claim 1, wherein the detection of the prior store by the core that accesses the shared memory takes place at a level of the shared memory by matching a target address of the memory block accessed by the load with a target address of the memory bock previously written by one or more stores from one or more other cores.

3. The computer system of claim 2, wherein:
    a store reaching the shared memory level inserts its target address in a read-after-write race detection structure;
    a read access that reaches the shared memory level checks the read-after-write race detection structure using the load's target address and determines, at a block granularity, either that there is no match with any prior store from a different core or that there is a match with a store from a different core which match has not been detected before;
    and
    upon detecting a match with a store from a different core, marks the information in the read-after-write race detection structure pertaining to the match, the detecting core, the accessed memory block, and the store from a different core to said memory block, as having been already detected by the detecting core.

4. The computer system of claim 2, wherein load instructions that are known to have previously detected stores are predicted to detect stores again a next time they execute and result in a check-for-race request being issued.

5. The computer system of claim 3, wherein upon a read access from a core that detects a match with a prior store from a different core in the read-after-write race detection structure, marks a multitude of memory blocks as having already been detected by the detecting core.

6. The computer system of claim 5 wherein the read-after-write race detection structure is a table which stores a set of hash signatures each hash signature corresponding to one or more cores and each hash signature encoding a multitude of block addresses;
    wherein a store inserts its address to the hash signatures corresponding to all other cores, except the signature corresponding to the core that issues the store;
    and wherein a core determines a match on a block address by testing whether the block address is present in its hash signature;
    and wherein a core marks the detection of a store on an address as already have been detected by deleting the address from its hash signature.

7. The computer system of claim 6 where the read-after-write race detection structure is a distributed table structure.

8. The computer system of claim 1, wherein after a cache line is accessed one or more times, a next access to the cache line results in a check-for-race request being sent to a shared memory level that performs detection of prior stores for this cache line, and wherein a successful detection of a prior store results in the cache line being invalidated in the at least one local cache memory of the core which accessed the cache line.

9. A cache coherence method in a computer system, the method comprising:
    accessing, by a processor core, a shared memory to load a memory block after the processor core misses in at least one local cache memory;
    detecting a prior store from another processor core to the memory block;
    in response to the detecting, enforcing program order of loads which are being executed by the processor core that issued the load of the memory block, such that loads which initiated prior to the load of the memory block are completed and loads which initiated after the load of the memory block are re-executed after completion of the load of the memory block; and
    wherein the detection of the prior store causes one or more cache lines in the at least one local cache memory of the processor core to be self-invalidated.

10. The cache coherence method of claim 9, wherein the detection of the prior store by the core that accesses the shared memory takes place at a level of a shared memory by matching a target address of the memory block accessed by the load with a target address of the memory bock previously written by one or more stores from one or more other cores.

11. The cache coherence method of claim 10, further comprising:
    inserting a target address of a store reaching the shared memory level in a read after-write race detection structure;
    checking, in response to a read access reaching the shared memory level, the read-after-write race detection structure using the read access' target address;
    determining, at a block granularity, either that there is no match with any prior store from a different core or that there is a match with a store from a different core which match has not been detected before; and
    upon detecting a match with a store from a different core, marking information in the read-after-write race detection structure pertaining to the match, the detecting core, the accessed memory block, and the store from a different core to said memory block, as having been already detected by the detecting core.

12. The cache coherence method of claim 10, wherein load instructions that are known to have previously detected stores are predicted to detect stores again a next time they execute and result in a check-for-race request being issued.

13. The cache coherence method of claim 11, further comprising: wherein upon a read access from a core that detects a match with a prior store from a different core in the read-after-write race detection structure, marking a multitude of memory blocks as having already been detected by the detecting core.

14. The cache coherence method of claim 13, wherein the read-after-write race detection structure is a table which stores a set of hash signatures each hash signature corresponding to one or more cores and each hash signature encoding a multitude of block addresses;

wherein a store inserts its address to the hash signatures corresponding to all other cores, except the signature corresponding to the core that issues the store;

wherein a core determines a match on a block address by testing whether the block address is present in its hash signature;

and wherein a core marks the detection of a store on an address as already have been detected by deleting the address from its hash signature.

15. The cache coherence method of claim 14, where the read-after-write race detection structure is a distributed table structure.

16. The cache coherence method of claim 9, wherein after a cache line is accessed one or more times, a next access to the cache line results in a check-for-race request being sent to a shared memory level that performs detection of prior stores for this cache line, and wherein a successful detection of a prior store results in the cache line being invalidated in the at least one local cache memory of the core which accessed the cache line.

* * * * *